Aug. 18, 1953  D. H. BRATTON ET AL  2,649,329
HINGED FINISH MOLDING

Filed May 21, 1952  3 Sheets-Sheet 1

Inventors
David H. Bratton &
James H. Wernig
By
Willito, Helwig & Baillio
Attorneys.

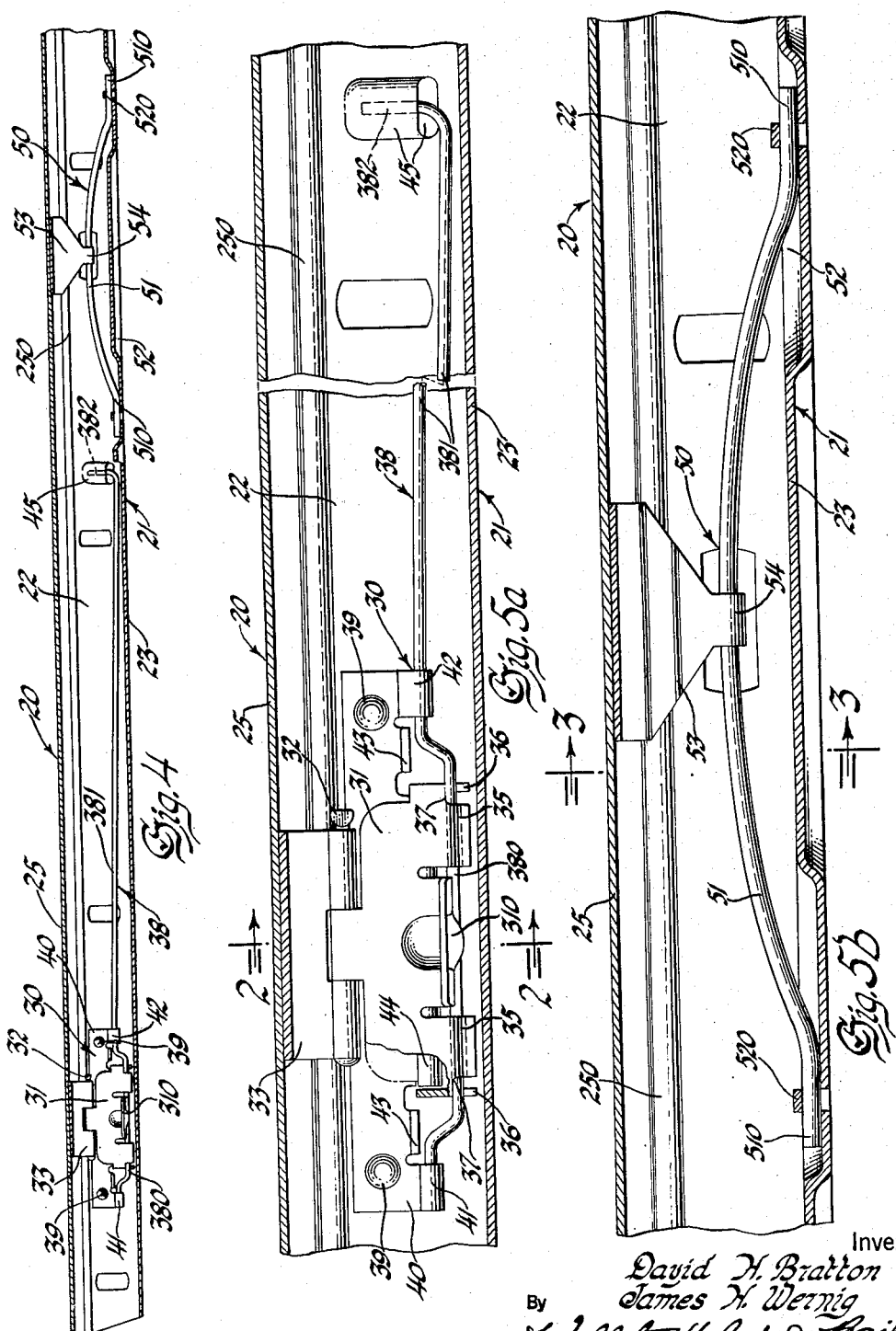

Patented Aug. 18, 1953

2,649,329

UNITED STATES PATENT OFFICE 2,649,329

HINGED FINISH MOLDING

David H. Bratton, Detroit, and James H. Wernig, Bloomfield Village, Mich., assignors to General Motors Corporation, Detroit, Mich., a corporation of Delaware Application May 21, 1952, Serial No. 289,088

10 Claims. (Cl. 296—44.5)

This invention relates to improvements in hinged finish moldings for automobiles.

The particular automobile body construction with which the invention is preferably employed is the "hard top" style which has outwardly swinging doors having a fixed frame at the upper front end of the door into which is pivotally mounted a "controlled ventilation" or "no draft" window element. A vertically sliding window is disposed rearwardly adjacent the controlled ventilation window frame. The automobile door itself carries no window header for the vertically opening door window, however, the door header is sometimes formed as an integral part of the roof rail and functions as window header for the vertically opening door window.

The primary object of the invention is to provide in automobile body construction improved and simplified hinged finish moldings which improve weather sealing at the joint between the top of a vertically opening door window and the fixed door header thereabove, the said hinged finish moldings also serving to enhance the esthetic appearance of the automobile body trim line at the door header above the vertically opening door window.

Another object of the invention is to provide improved spring loaded actuating mechanism and over-center spring means for hinged finish moldings carried by an automobile door header for receiving the top of a vertically opening automobile door window, the said hinged finish molding including a swingable finish molding strip which is spring urged to swing outwardly to a horizontal position upon opening the vehicle door whereby to permit opening and closing of the door when the window is closed.

A further object of the invention is to provide an improved hinged finish molding including weatherstripping forming a glass channel at the door header of an automobile which receives the top of the vertically sliding door window when closed, the outer member of the said molding being hinged and spring loaded to swing outwardly responsive to the opening of the door whereby to permit the door to be opened when the window thereof is closed, the said hinged finish molding including improved and simplified actuating and over-center spring mechanism causing the said outer hinged member thereof to swing downwardly responsive to closing the door whereby to form a glass channel which receives and weather seals the top of the door window.

Other objects of the invention will become apparent by reference to the following detailed description taken in connection with the accompanying drawings, in which:

Fig. 4 is a horizontal sectional view of the hinged finish molding shown in Figs. 1–3 inclusive taken on the line 4—4 of Fig. 2.

Figs. 5A and 5B are fragmentary enlargements of the construction shown in Fig. 4.

Figures 1, 2, 3:
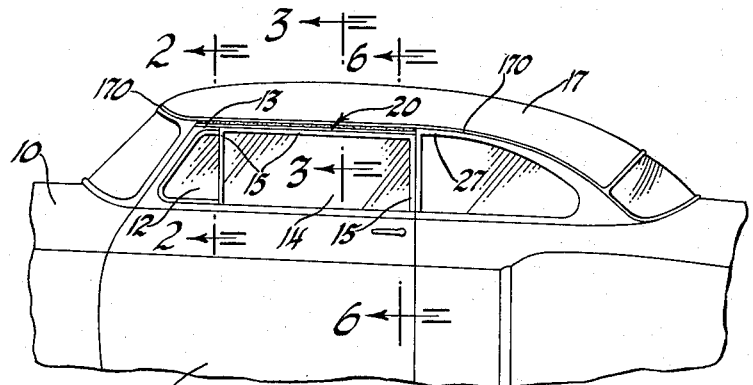
Fig. 1 is a fragmentary side elevational view of an automobile having its door header equipped with a hinged finish molding embodying the invention.
Fig. 2 is an enlarged vertical sectional view taken substantially on the line 2—2 of Fig. 1 at the fixed controlled ventilation window frame showing improved and simplified spring loaded actuating mechanism embodying the invention usable to actuate the hinged finish molding.
Fig. 3 is a vertical sectional view taken on the line 3—3 of Fig. 1 showing over-center spring means employed to initially hold back and later assist in the swinging of the hinged element of the hinged finish molding and to resiliently maintain the said hinged element in either its open or its closed position.

Referring now to the drawings wherein like numerals refer to like and corresponding parts throughout the several views, the particular embodiment of the invention is shown therein for illustrative purposes in connection with a hard top type automobile body 10 having a door 11 hinged to the body 10 at the front thereof. The door 11 is provided with a controlled ventilation or no draft window 12 pivotally mounted in a fixed frame 13 and a vertically sliding window 14 having an ornamental metal trim strip 15. The said door 11 is not provided with a window header, the door header 16 of the hard top 17 serving both as door header and as a header for vertically sliding window 14. Outwardly of the door header 16 secured to the hard top 17 is the usual drip molding or rain gutter 170, and inwardly thereof may be provided an interior trim molding 18.

In the illustrative construction, a hinged finish molding 29 is provided which comprises a fixed angular anchorage strip 21 secured along one of its legs 22 to the door header 16 by such means as screws 160 with its other leg 23 thereof depending therefrom to which is secured a suitable weather strip element 24, and a swingable strip 25 hingedly connected to said angular anchorage strip 21 along the leg 22 thereof and to which is secured a suitable weather strip element 26. When the swingable strip 25 is swung to a position substantially parallel to the depending leg 23 of the angular anchorage strip 21, the said weather strip elements 24 and 26 are disposed in opposite spaced relationship, and the said hinged finish molding forms and provides a glass channel to receive and weather seal the upper edge of the vertically sliding door window 14 at the trim molding 15 thereof.

The hinged connection of the swingable strip 25 to the anchorage strip 21 is illustrated to be accomplished by providing the leg 22 of the anchorage strip 21 and the upper portion of the swingable strip 25 with complementary hinge rolls 220 and 250 respectively. The complementary hinge roll 220 and 250 are preferably rather loosely nested whereby to permit the hinged finish molding to accommodate itself to slight curvatures or slight inaccuracies in installation. Obviously, other types of hinge construction may be employed.

The anchorage strip 21 and the swingable strip 25 may be formed of stainless steel, both preferably having their free edges rolled to provide rigidity and to engage the lower edges of the weather strip elements 24 and 26 respectively. The swingable strip 25 is not entirely rigid inasmuch as some twisting thereof is desirable during the closing of the vehicle door as hereinafter described. The width of the swingable strip 25 is preferably such that, when swung to a depending position, the lower rolled edge thereof is disposed in alignment with the rear side window ornamental trim strip 27 of the automobile body 10.

A flashing element 28 of flexible rubber, neoprene or other suitable material is positioned between the door header 16 and the leg 22 of the anchorage strip 21 and has a resilient depending outer flange 280 extending over the hinge rolls 220 and 250 and into contact with the outside of the swingable strip 25 below the hinge roll 250 thereof to weather and dust seal the hinged finish molding at the hinge thereof. Other types of flashing elements may be employed.

Figure 6:
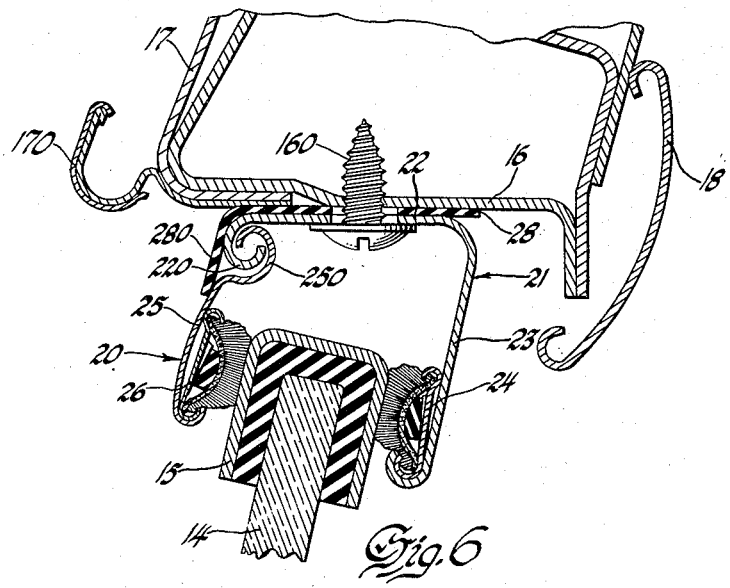
Fig. 6 is a vertical sectional view taken on the line 6—6 of Fig. 1.

A suitable operating mechanism for the hinged finish molding 20 comprises two elements. One element is the actuating mechanism generally designated by the numeral 30 and the other element is over-center spring mechanism generally designated by the numeral 50. The actuating mechanism 30 is preferably located opposite the rear top portion of the controlled ventilation window frame 13 and is spring loaded as hereinafter described in detail to normally urge the swingable strip 25 to an outwardly disposed horizontal position shown in Fig. 7. The over-center spring mechanism 50 employed with the actuating mechanism 30 is located rearwardly of the actuating mechanism 30, and its construction and function relative to the actuating mechanism 30 will later be described in detail. The said actuating mechanism 30 is employed to swing the said swingable strip 25 from its spring loaded horizontal position shown in Fig. 7 to its downward disposed position shown in Fig. 2 responsive to the closing of the door 11. The actuating mechanism 30 includes a lever 31 formed to provide a striker or contact element 310 contactable by the controlled ventilation window frame 13 or some other fixed element on the door 11 when the said door 11 is closed causing the actuating mechanism 30 to swing the swingable strip 25 from its horizontal position shown in Fig. 7 to a depending position as shown in Figs. 2, 3 and 6.

When the swingable strip 25 is in its depending position, there is formed within the hinged finish molding 20 a weather stripped glass channel for the upper edge of the vertically sliding door window 14 at the trim molding 15 thereof. If the sliding door window 14 is open (down) when the door 11 is closed, the glass channel formed within the hinged finish molding 20 is ready for receiving the upper trim molding 15 of the sliding door window 14 when the said sliding door window 14 is raised to its closed position. However, if the sliding door window is already closed (up) when the door 11 is open, the inside surface of the upper trim molding 15 of the sliding door window 14 swings with the closing of the door 11 into abutment with the weather strip element 24 on the depending leg 23 of the fixed anchorage strip 21 and the weather strip element 26 carried by the swingable strip 24 is swung by the final closing movement of the door 11 into abutment with the outer surface of the upper trim molding 15 of the sliding door window 14. Obviously, whenever the door 11 is opened even a relatively slight distance, the swingable strip 25 swings outwardly to its horizontal position shown in Fig. 7 whereby to provide clearance for the top of the sliding door window 14 if in its raised position when the door 11 is opened.

The particular actuating mechanism 30 preferably employed to move the swingable strip 25 responsive to closing and opening the vehicle door 11 is disclosed in Figs. 2, 4, 5A and 7, and comprises a floating lever 31 hingedly connected at one side thereof by a hinge pin 32, clip 33 and rivets 34 to the inside of the swingable strip 25. The other side of the said floating lever 31 is provided with a pair of tabs 35 near the ends thereof, which ends are formed into abutments 36. The said tabs 35 and abutments 36 of the operating lever cooperate to provide a spring seat generally designated by the numeral 37 in Figs. 2 and 7 to receive the offset link portion 380 of a torsion type spring 38 which is pivotally connected to a clip 40 by a fully closed loop 41 and a partially closed loop 42 of the said clip 40. The clip 40 is secured by such means as the rivets 39 to the horizontally disposed leg 22 of the fixed angular anchorage strip 21.

The arcuate thrust of the torsion spring 38 maintains the off-set link portion 380 thereof into engagement with the floating lever 31 at the seats 37 thereof formed by the tabs 35 and the edge of the adjacent abutments 36 thereof. Upstanding tabs 43 on the clip 40 serve to limit the arcuate movement of the off-set link portion 380 of the torsion spring 38 toward the swingable strip 25 thereby limiting the outward swinging thereof to a substantially horizontal position by limiting the outward urge of the floating lever 31. A central rolled over portion 44 on the clip 40 cooperates with the abutments 36 of the floating lever 31 to prevent excessive longitudinal movement of the swingable strip 25 in respect to the horizontal leg 22 of the fixed angular anchorage strip 21 along their hinge rolls 250 and 220 respectively.

Figure 7:
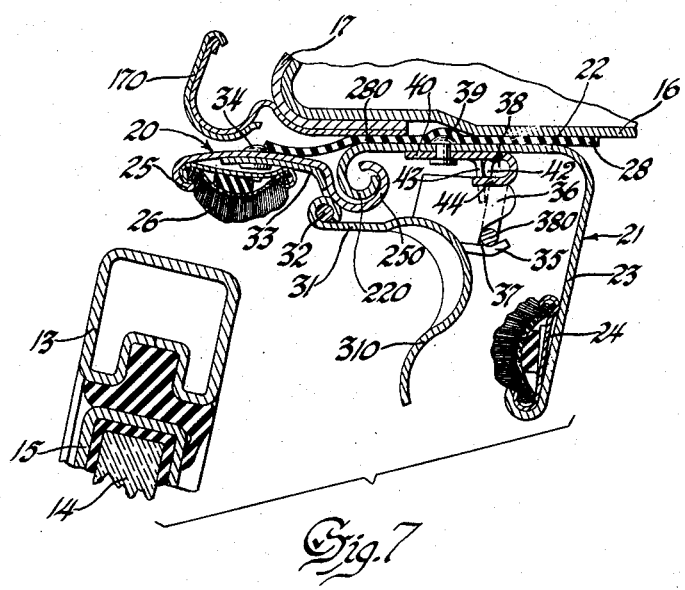
Fig. 7 is a vertical sectional view similar to Fig. 2 showing the outer hinged member of the hinged finish molding swung outwardly as when the vehicle door is open.

The arcuate thrust of the torsion spring 38 employed to constantly spring urge the swingable strip 25 toward its horizontal position shown in Fig. 7 is preferably obtained by the anchorage of the long portion 381 of the torsion spring 38 by forming a hook 382 on its extreme end and engaging the said hook 382 into a suitable transversely disposed pocket 45 formed in the horizontal leg 22 of the fixed angular anchorage strip 21. The spring force of the torsion spring 38 must be greater than the resistance of the over-center spring mechanism 50 to its snap-over action. By use of a long torsion spring 38, its fatigue to repeated operation of the hinged finish molding will be less with a resultant longer service life. The use of the floating of the lever 31 on the off-set link portion 380 of the torsion spring 38 provides an economy of manufacture and assembly of the actuating mechanism 30. In assembly, the hook 382 of the torsion spring 38 is inserted in the pocket 45 of the horizontal leg 22 of the angular anchorage strip 21, the left end of the spring 38 as viewed in Fig. 5A is inserted in the closed loop 41 of the clip 40, and the spring 38 is inserted in the partially closed loop 42 at the right of the off-set link portion 380 thereof as viewed in Fig. 5A, the said off-set link portion 380 being positioned in the spring seats 37 of the floating lever 31.

The over-center spring mechanism 50 best shown in Figs. 3, 4 and 5B is preferably located at or slightly to the rear of the longitudinal center of the huge finish molding 20 and comprises a bow type over-center spring element 51 having its ends 510 slidably journaled in longitudinally disposed spaced bridged depressions 52 formed in the horizontal leg 22 of the fixed angular anchorage strip 21, the bridges 520 serving as retaining elements for the ends 510 of the spring element 51. The over-center spring element 51 is hingedly connected to the swingable strip 25 by a clip 53 having an outer looped end 54 through which the said over-center spring element 51 is disposed. The base of the said clip 53 is rigidly secured to the swingable strip 25 by such means as the rivets 55.

The spring force of the over-center spring element 51 is such that the resistance to the snap-over action of the over-center spring mechanism 50 is always less than the spring force of the torsion spring 38. This relationship must be maintained to assure the outward swinging of the swingable strip 25 upon opening of the vehicle door 11. Also, because the vehicle door 11 closes first near the front end thereof where it is hinged to the vehicle body 10, it is necessary to hold the rear portion of the swingable strip 25 from swinging downwardly as rapidly as the front end thereof. This is accomplished when the vehicle door 11 is being closed by the delayed action of the over-center spring mechanism 50 in respect to the actuating mechanism 30 causing a twisting of the swingable strip 25 between the actuating mechanism 30 and the over-center spring mechanism 50. This twisting of the swingable strip 25 must not stress it beyond its torsional elastic limit so that no permanent deformation thereof will occur. The improved actuating mechanism 30 and over-center spring mechanism 50 and the relationships therebetween herein disclosed have been found extremely desirable in practice to produce improved functioning of hinged finish moldings and long life thereof.

Although but a single embodiment of the invention has been disclosed and described in detail, it is obvious that many changes may be made in the size, shape, arrangement and detail of the various elements of the invention without departing from the spirit and scope thereof as defined by the appended claims.

We claim:

1. A hinged finish molding for weather sealing the joint between the door header and the vertically opening door window of swinging automobile doors comprising a fixed angular anchorage strip having one leg thereof securable horizontally along the door header and the other leg thereof depending therefrom, a swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an off-set portion therebetween pivotally connected at its base portions to the horizontally disposed leg of said anchorage strip, said off-set link element being of spring wire having an extended end torsionally anchored to the said horizontally disposed leg resiliently pivoting its off-set portion about its base portions toward said swingable finish molding strip, an actuating lever engageable by a fixed door member when said door is closed pivotally connected to said swingable finish molding strip outwardly of the hinge thereof and to said off-set portion of said off-set link element, said off-set link element being spring loaded to pivot the off-set portion thereof toward said swingable finish molding strip whereby to constantly urge said swingable finish molding strip toward its horizontally outward position.

2. A hinged finish molding for weather sealing the joint between the door header and the vertically opening door window of swinging automobile doors comprising a fixed angular anchorage strip having one leg thereof securable horizontally along the door header and the other leg thereof depending therefrom, a swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an off-set portion therebetween pivotally connected at its base portions to the horizontally disposed leg of said anchorage strip, said off-set link element being of spring wire having an extended end torsionally anchored to the said horizontally disposed leg resiliently pivoting its off-set portion about its base portions toward said swingable finish molding strip, an actuating lever engageable by a fixed door member when said door is closed pivotally connected to said swingable finish molding strip outwardly of the hinge thereof and to said off-set portion of said off-set link element.

3. A hinged finish molding for weather sealing the joint between the door header and the vertically opening door window of swinging automobile doors comprising a fixed angular anchorage strip having one leg thereof securable horizontally along the door header and the other leg thereof depending therefrom, a swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an offset portion therebetween pivotally connected at its base portions to the horizontally disposed leg of said anchorage strip, an actuating lever engageable by a fixed door member when said door is closed pivotally connected to said swingable finish molding strip outwardly of the hinge thereof and to said off-set portion of said off-set link element, said off-set link element being of spring wire and formed with an extended end anchored to the said horizontally disposed leg of said angular anchorage strip to torsionally urge said off-set portion to swing around its base pivots and bias said actuating lever to swing said swingable finish molding strip horizontally outwardly when the vehicle door is opened.

4. A hinged finish molding for weather sealing the joint between the door header and the vertically opening door window of swingable automobile doors comprising a fixed angular anchorage strip having one leg thereof securable horizontally along the door header and the other leg thereof depending therefrom, a torsionally flexible swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an off-set portion therebetween pivotally connected at its base portions to the horizontally disposed leg of said anchorage strip, said off-set link element being of spring wire having an extended end torsionally anchored to the said horizontally disposed leg resiliently pivoting its off-set portion about its base portions toward said swingable finish molding strip, an actuating lever engageable by a fixed door member when said door is closed pivotally connected to said swingable finish molding strip outwardly of the hinge thereof and to said off-set portion of said off-set link element, and an over-center spring mechanism spaced rearwardly from said actuating mechanism having a lesser spring strength against snap-over action than the spring urge of the said actuating mechanism.

5. A hinge finish molding for weather sealing the joint between the door header and the vertically opening door window of swingable automobile doors comprising a fixed angular anchorage strip having one leg thereof securable horizontally along the door header and the other leg thereof depending therefrom, a torsionally flexible swingable finish molding strip, hinge means connecting said swingable strip to said anchorage strip in spaced relationship to the depending leg thereof, spring loaded actuating mechanism constantly urging said swingable finish molding strip horizontally outward including an actuating lever engageable by a fixed door member when said door is closed to swing said swingable finish molding strip downwardly, over-center spring mechanism spaced rearwardly from said actuating mechanism having a lesser spring strength than that of the said actuating mechanism delaying the downward swinging of the rearward portion of the swingable finish molding strip in respect to the forward portion thereof, the torsional flexing of the said swingable strip between the actuating mechanism and the over-center spring mechanism being within the torsional elastic limit thereof.

6. A hinged finish molding for weather sealing the joint between the door header and the vertically opening door window of swingable automobile doors comprising a fixed angular anchorage strip having one leg thereof securable horizontally along the door header and the other leg thereof depending therefrom, a torsionally flexible swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an off-set portion therebetween pivotally connected at its base portions to the horizontally disposed leg of said anchorage strip and an actuating lever engageable by a fixed door member when said door is closed pivotally connected to said swingable finish molding strip outwardly of the hinge thereof and abutting said off-set portion of said off-set link element, said off-set link element being of spring wire and formed with an extended end anchored to the said horizontally disposed leg of said angular anchorage strip to torsionally urge said off-set portion to swing around it base pivots and cause said actuating lever to swing said swingable finish molding strip horizontally outward when the vehicle door is opened, over-center spring mechanism spaced rearwardly from said actuating mechanism having a lesser spring strength against snap-over action than the outward spring urge of the said actuating mechanism, said over-center spring causing a lag in operation of said over-center spring mechanism in respect to the said actuating mechanism when the vehicle door is being closed whereby to delay the downward swinging of the rearward portion of the swingable finish molding strip in respect to the forward portion thereof.

7. A hinged finish molding for weather sealing the joint between the door header and the vertically opening door window of swingable automobile doors comprising a fixed angular anchorage strip having one leg thereof securable horizontally along the door header and the other leg thereof depending therefrom, a swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an off-set portion therebetween pivotally connected at its base portions to the horizontally disposed leg of said anchorage strip and an actuating lever engageable by a fixed door member when said door is closed pivotally connected to said swingable finish molding strip outwardly of the hinge thereof and to said off-set portion of said off-set link element, said off-set link element being spring loaded to pivot the off-set portion thereof toward said swingable finish molding strip whereby to constantly urge said swingable finish molding toward its horizontally outward position.

8. A hinged finish molding for weather sealing the joint between the door header and the vertically opening door window of swingable automobile doors comprising a fixed angular anchorage strip having one leg thereof securable horizontally along the door header and the other leg thereof depending therefrom, a swingable finish molding strip, hinge means connecting said swingable strip to said anchorage strip in spaced relationship to the depending leg thereof, actuating mechanism constantly urging said swingable finish molding strip horizontally outward composed of an arcuately movable off-set link element having spaced base portions and an off-set portion therebetween pivotally connected at its base portions to the horizontally disposed leg of said anchorage strip and an actuating lever engageable at its outer end by a fixed door member when said door is closed pivotally connected to said swingable finish molding strip outwardly of the hinge thereof formed to receive at its inner end said off-set portion of said off-set link element, said off-set link element being of spring wire and formed with an extended end torsionally anchored to the said horizontally disposed leg of said angular anchorage strip to torsionally urge said off-set portion to swing around its base pivots and urge said actuating lever to swing said swingable finish molding strip horizontally outward when the vehicle door is opened.

9. A hinged finish molding for weather sealing the joint between the door header and the vertically opening door window of swinging automobile doors comprising a fixed anchorage strip securable horizontally along the door header, a swingable finish molding strip, hinge means connecting said swingable strip to said anchorage strip, actuating mechanism constantly urging said swingable finish molding strip horizontally outward composed of an arcuately movable off-set link element having spaced base portions and an off-set portion therebetween pivotally connected at its base portions to said anchorage strip, said off-set link element being of spring wire having an extended end torsionally anchored to said anchorage strip resiliently pivoting its off-set portion about its base portions toward said swingable finish molding strip, an actuating lever engageable by a fixed door member when said door is closed pivotally connected to said swingable finish molding strip outwardly of the hinge thereof and to said off-set portion of said off-set link element, said off-set link element being spring loaded to pivot the off-set portion thereof toward said swingable finish molding strip whereby to constantly urge said swingable finish molding strip toward its horizontally outward position.

10. A hinged finish molding for weather sealing the joint between the door header and the vertically opening door window of swinging automobile doors comprising a fixed anchorage strip securable horizontally along the door header and with a leg thereof depending therefrom, a swingable finish molding strip, hinge means connecting said swingable strip to said anchorage strip, actuating mechanism constantly urging said swingable finish molding strip horizontally outward composed of an arcuately movable off-set link element having spaced base portions and an off-set portion therebetween pivotally connected at its base portions to said anchorage strip, said off-set link element being of spring wire having an extended end torsionally anchored to said anchorage strip resiliently pivoting its off-set portion about its base portions toward said swingable finish molding strip, an actuating lever engageable by a fixed door member when said door is closed pivotally connected to said swingable finish molding strip outwardly of the hinge thereof and to said off-set portion of said off-set link element.

DAVID H. BRATTON.
JAMES H. WERNIG.

References Cited in the file of this patent

FOREIGN PATENTS

| Number  | Country | Date          |
|---------|---------|---------------|
| 602,276 | Germany | Feb. 10, 1932 |
| 581,038 | Germany | July 20, 1933 |
| 634,860 | Germany | Sept. 5, 1936 |